US012804115B2

(12) United States Patent
Cong

(10) Patent No.: US 12,804,115 B2
(45) Date of Patent: Nov. 17, 2026

(54) METHOD OF 3D IMAGE PROCESSING AND SYSTEM THEREOF

(71) Applicant: Continental Automotive Technologies GmbH, Hannover (DE)

(72) Inventor: Weiquan Cong, Singapore (SG)

(73) Assignee: Continental Automotive Technologies GmbH, Hannover (DE)

(*) Notice: Subject to any disclaimer, the term of this patent is extended or adjusted under 35 U.S.C. 154(b) by 0 days.

(21) Appl. No.: 18/836,147

(22) PCT Filed: Nov. 3, 2022

(86) PCT No.: PCT/EP2022/080611
§ 371 (c)(1),
(2) Date: Aug. 6, 2024

(87) PCT Pub. No.: WO2023/147904
PCT Pub. Date: Aug. 10, 2023

(65) Prior Publication Data
US 2025/0119519 A1 Apr. 10, 2025

(30) Foreign Application Priority Data
Feb. 7, 2022 (GB) ..................................... 2201504

(51) Int. Cl.
*H04N 13/156* (2018.01)
*G01S 17/42* (2006.01)
(Continued)

(52) U.S. Cl.
CPC ........... *H04N 13/156* (2018.05); *G01S 17/42* (2013.01); *G01S 17/894* (2020.01);
(Continued)

(58) Field of Classification Search
CPC .. H04N 13/156; H04N 13/246; H04N 13/254; H04N 13/302; H04N 13/214; H04N 23/74; H04N 23/56; G01S 17/42
(Continued)

(56) References Cited

U.S. PATENT DOCUMENTS 6,760,134 B1 * 7/2004 Schilling .................. G03H 1/08 359/9
2006/0221250 A1 10/2006 Rossbach et al.
(Continued)

FOREIGN PATENT DOCUMENTS

| | | |
|---|---|---|
| EP | 0585620 A1 | 3/1994 |
| EP | 2602640 A1 | 6/2013 |
| WO | 2019245719 A1 | 12/2019 |

OTHER PUBLICATIONS

Office Action (Communication pursuant to Article 94(3) EPC) issued Oct. 8, 2025, by the European Patent Office in corresponding European Patent Application No. 22 809 882.8-1206. (9 pages).
(Continued)

*Primary Examiner* — Thai Q Tran
(74) *Attorney, Agent, or Firm* — Buchanan Ingersoll & Rooney PC

(57) ABSTRACT

A method of processing images captured within a motor vehicle is disclosed. The method comprises modulating, by way of an illumination source, a continuous wave (CW) light wave to an image module and receiving, by way of the image module, at least three image beams, each of the at least three image beam containing a content of an interior of a motor vehicle captured in at least a different frequency. An image processing unit executes the step of correlating by way of an image processing unit, a location measurement of the at least three image beams captured by the image module, wherein each of the three image beams is captured in a different frequency and creating a three-dimensional
(Continued)

(3D) image in response to the location measurement correlated. A system, computer program product and a computer-readable medium is also disclosed.

19 Claims, 4 Drawing Sheets

(51) Int. Cl.

| | |
|---|---|
| ***G01S 17/894*** | (2020.01) |
| ***H04N 13/214*** | (2018.01) |
| ***H04N 13/246*** | (2018.01) |
| ***H04N 13/254*** | (2018.01) |
| ***H04N 13/302*** | (2018.01) |
| ***H04N 23/56*** | (2023.01) |
| ***H04N 23/74*** | (2023.01) |

(52) U.S. Cl.

CPC ......... *H04N 13/214* (2018.05); *H04N 13/246* (2018.05); *H04N 13/254* (2018.05); *H04N 13/302* (2018.05); *H04N 23/56* (2023.01); *H04N 23/74* (2023.01)

(58) Field of Classification Search

USPC ......................................... 348/42, 47, 48, 49

See application file for complete search history.

(56) References Cited

U.S. PATENT DOCUMENTS

| | | | | |
|---|---|---|---|---|
| 2010/0271615 | A1 | 10/2010 | Sebastian et al. | |
| 2016/0295193 | A1 | 10/2016 | Van Nieuwenhove et al. | |
| 2016/0363669 | A1* | 12/2016 | Liu | G01S 7/4815 |
| 2017/0094251 | A1 | 3/2017 | Wolke et al. | |
| 2022/0276164 | A1* | 9/2022 | Aceti | G01S 7/4815 |
| 2023/0007853 | A1* | 1/2023 | Li | G01S 7/4813 |
| 2025/0060605 | A1* | 2/2025 | Jeong | G02B 27/0179 |
| 2025/0215664 | A1* | 7/2025 | Danguchi | B60R 21/0134 |
| 2025/0216516 | A1* | 7/2025 | Goren | G01S 7/4817 |

OTHER PUBLICATIONS

Search Report dated Jul. 29, 2022 from corresponding GB patent application No. 2201504.4.

International Search Report and Written Opinion dated Feb. 27, 2023 from corresponding International patent application No. PCT/EP2022/080611.

Office Action (Notice to Submit Response) issued Apr. 20, 2026, by the Korean Ministry of Intellectual Property Office in corresponding Korean Patent Application No. 10-2024-7029402 and an English translation of the Office Action. (16 pages).

* cited by examiner

METHOD OF 3D IMAGE PROCESSING AND SYSTEM THEREOF

CROSS REFERENCE TO RELATED APPLICATIONS

This US patent application claims the benefit of PCT patent application no. PCT/EP2022/080611, filed Nov. 3, 2022, which claims the benefit of German patent application no. 2201504.4, filed Feb. 7, 2022, both of which are hereby incorporated by reference.

TECHNICAL FIELD

This disclosure relates to image sensing, in particular 3D image sensing and more in particular, image processing of 3D images.

BACKGROUND

Increasingly, the automotive industry is using camera systems for monitoring functions, to support vehicular applications within a motor vehicle. By way of example, cameras may be used onboard vehicles, for example in monitoring systems for monitoring activities in a passenger cabin of a motor vehicle. Onboard monitoring systems are often used to detect a status of a driver, to determine if the driver is fatigue or not paying attention on the road. For driver's monitoring systems, status of a driver is often determined through eye tracking function. However, images captured by monitoring systems are often subject to influence from ambient light rays which affects the quality of images captured. Ambient light rays may include light rays external to the motor vehicle, such as sunlight or it may also be stray light rays from interior of motor vehicle, for example reflective surfaces within a passenger cabin. Apart from the need to increase accuracy of image processing to counter adverse effects of ambient lighting, implementation of on-board or in-vehicle cameras often faces the challenge of space constrains, i.e. position within the cockpit area that allows a best view of the driver.

Camera systems may also be used to monitor surrounding of motor vehicles, to detect obstacles on the road, or passengers dashing across roads unexpectedly. The images detected may then be used to execute vehicular safety functions, for example, alerting the driver and/or during autonomous driving mode, inform the vehicle such that a decision can be made impromptu. Due to safety issues, accuracy of information captured in the images is of optimal importance.

There is therefore a need to provide a method and system for creating 3D images for further processing, which ameliorates some of the problems of vehicle displays described above.

SUMMARY

A purpose of this disclosure is to ameliorate the problem of accuracy of producing 3D images for image processing, in particular producing 3D images for vehicular systems, by providing the subject-matter of the independent claims.

The objective of this disclosure is solved by a method of processing images, the method comprising modulating (402), by way of an illumination source, a continuous wave (CW) light wave to an image module, the CW light wave modulating in at least three different frequencies, receiving (404), by way of the image module, at least three image beams, each of the at least three image beam containing a content of a moving object captured in at least a different frequency, correlating (406), by way of an image processing unit, a location measurement of the at least three image beams captured by the image module, wherein each of the three image beams contains an image of the moving object captured in a different frequency, and creating (408) a three-dimensional (3D) image, in response to the location measurement correlated.

The above described aspect of this disclosure yields a method of creating 3D images by using image beams captured in multiple frequencies and more in particular, at least three types of frequencies, to determine a location measurement. More advantageously, 3D images created from the aforesaid method yields high accuracy of location measurement for images captured under long-range condition, i.e. the moving object is positioned far away from the field of view of an image module.

In an embodiment of the method as described above, the location measurement comprises identifying, by way of the image processing unit, a distance alignment amongst the at least three image beams captured.

The above aspect of this disclosure is to compare the image beams captured at different frequencies to identify a distance alignment, thereby achieve location measurement. Each frequency modulation has a different ambiguity distance.

In an embodiment of the method as described above, the distance alignment comprises a point of pixel coordinate coinciding on the at least three image beams captured.

The above aspect of this disclosure is to locate a point of pixel coordinate amongst the image beams compared, where all the different frequencies agree or coincides. Therefore, the location measurement of distance alignment is achieved by locating a point where all the different frequencies agree or coincides. Consequently, the location measurement correlates to a true location of the moving object observed.

In an embodiment of the method as described above, the method further comprises aligning, by way of the image processing unit, two or more points of pixel coordinates of the at least three image beams captured with reference to a single optical axis.

The above aspect of this disclosure is to provide a single optical axis to calibrate at least three image beams captured in different frequencies, such that distance alignment of the three or more image beams captured may be easily identified. The image processing process may be completed in a fast and highly accurate manner.

In an embodiment of the method as described above, the method further comprises calibrating, by way of the image processing unit, two or more points of pixel coordinates on the at last three image beams captured against an image pattern, for aligning the pixel coordinates of the at least three image beams.

The above aspect of this disclosure is to use an image pattern to identify the distance alignment amongst the at least three image beams captured in different frequencies. This increases the accuracy of depth measurement, to yield high accuracy 3D imaging.

In an embodiment of the method as described above, the method further comprises identifying, by way of the image processing unit, one or more critical point of pixel coordinates on the at least three image beams captured.

The above aspect of this disclosure is to identify pixel coordinates that provides or denote information of importance for purposes of image processing amongst the at least three image beams captured, based upon calibration with an image pattern provided. Example of information of importance in the context herein may refer to pixel coordinates which helps to identify at least a part of the moving object captured by the image module.

In an embodiment of the method as described above, the correlating the location measurement comprises adjusting a frequency modulation of the at least three image beams captured, and identifying the distance alignment amongst the at least three beams captured.

The above aspect of this disclosure is to correlate the location measure by adjusting raw data obtained from image beams captured using time domain based frequency modulation. In this embodiment, identifying the distance alignment amongst the image beams captured is necessary to identify the point of coordinates which coincides.

In an embodiment of the method as described above, the method further comprises storing the one or more critical point of coordinates identified in a memory of the image processing unit for an image post-processing process.

The above aspect of this disclosure is to store the critical points of coordinates identified from the location measurement process such that the information may be applied to further post-image processing.

In an embodiment of the method as described above, the image post-processing process comprises identifying an eye position, a head position, at least one characteristics of a facial feature, a hand gesture of a vehicle occupant, a vehicle seat belt status of a vehicle occupant, a presence of a living object in an interior cabin of a motor vehicle in response to locking of at least one vehicle access of the motor vehicle, a living object moving towards a motor vehicle relative to a radius surrounding the motor vehicle, or combination thereof, in response to the 3D image created.

The above aspect of this disclosure is to use the critical points of coordinates identified from the location measurement process, to apply to further post-processing image processes such as identifying an eye position, a head position, a characteristics of a facial feature or a combination, for purposes of in-vehicle monitoring function.

In an embodiment of the method as described above, the method further comprises displaying the three-dimensional (3D) image created on a display device within an interior of a motor vehicle.

The above aspect of this disclosure is to display a 3D image created in response to the at least three image beams captured. In certain embodiments, the displaying of 3D images captured and processed using the method as disclosed herein serves as an alert to drivers.

The objective of this disclosure is solved by a 3D image processing system for a motor vehicle, the 3D image processing system comprising an image module (102) operable to receive at least three image beams (302, 304, 308), each of the at least three image beams (302, 304, 308) containing a content of a moving object captured in a different frequency; an illumination source operable to modulate a continuous wave (CW) light wave to the image module in at least three different frequencies; and an image processing unit operable to process the at least three image beams captured by the image module, wherein the image processing unit is operable to correlate a location measurement of the at least three image beams captured by the image module, wherein each of the at least three image beams is captured in a different frequency, and create a three-dimensional (3D) image in response to the location measurement correlated.

The above described aspect of this disclosure yields a 3D image processing system operable to capture multiple image beams containing contents in different frequencies for fast and accurate location measurement to create 3D images. More advantageously, 3D images created from the aforesaid method improves accuracy of location measurement for images captured under dimly-lit ambient lighting.

In an embodiment of the system as described above, the image module is operable to capture at least three image beams of the moving object containing image content in at least three different frequencies.

The above aspect of this disclosure yields an image module which can capture at least three image beams containing image content in at least three different frequencies.

In an embodiment of the system as described above, the system further comprises an optical lens operable to cover the image module, wherein a side of the optical lens is facing the moving object, the optical lens operable to receive ambient light rays surrounding the moving object.

The above aspect of this disclosure yields an image module with a field of view (FOV) facing the moving object. In some embodiments, the optical lens may be coated, to fulfill filtering objectives.

In an embodiment of system as described above, the image module comprises at least one time-of-flight (TOF) image sensor.

The above aspect of this disclosure yields an image module which only requires one TOF image sensor to process three image beams captured in different frequencies. Therefore, a compact image module can be achieved.

In an embodiment of the system as described above, the image module comprises three TOF image sensors.

The above aspect of this disclosure yields an image module which requires three TOF image sensors to process three image beams captured in different frequencies. Consequently, the image beams can be processed in a relatively faster and accurate manner.

In an embodiment of the system as described above, the system further comprises an image beam splitter operable to provide a single optical axis to capture the content of the moving object, and transmit one or more image beams to each of the three TOF image sensors.

The above aspect of this disclosure is to capture three image beams in different frequencies sharing a single optical axis. This enables pixel to pixel alignment amongst different TOF image sensors, thereby increasing the accuracy of location measurement. Further, after capturing the image beams, the image beam splitter enables transmitting the image beams to a corresponding TOF image sensor in the same type of frequency. Consequently, the raw data captured in the image beams may be processed in a faster and highly accurate manner.

In an embodiment of the system as described above, the image beam splitter is a near infrared (NIR) beam splitter.

The above aspect of this disclosure is to process image beams captured, such that the images may be split according to frequency range. Advantageously, using a NIR beam splitter yields an image beam in near infrared range.

In an embodiment of the system as described above, an image pattern placed forward of the side of the optical lens facing the moving object, wherein two or more points of pixel coordinates on the image beams captured is calibrated against the image pattern, to identify one or more critical point of pixel coordinates on the at least three image beams captured.

The above aspect of this disclosure is to calibrate pixel to pixel of the image beams captured against an image pattern.

Advantageously, critical point of pixel coordinates may be identified through the calibration process.

The objective of this disclosure is solved by computer program product comprising instructions to cause the image processing system as defined above to execute the steps of the method as described above.

The above described aspect of this disclosure yields a computer program product for creating 3D images by using image beams captured in multiple frequencies and more in particular, at least three types of frequencies, to determine a location measurement. More advantageously, 3D images created from the aforesaid computer program product yields high accuracy and is suitable for capturing images of moving objects in long-range.

The objective of this disclosure is solved by a computer-readable medium having stored thereon the computer program as described above.

The above described aspect of this disclosure yields a computer-readable medium for creating 3D images by using image beams captured in multiple frequencies and more in particular, at least three types of frequencies, to determine a location measurement. More advantageously, 3D images created from the aforesaid computer-readable medium achieves high accuracy of location measurement for images captured in long-range.

BRIEF DESCRIPTION OF DRAWINGS

Other objects and aspects of this disclosure will become apparent from the following description of embodiments with reference to the accompanying drawings in which.

Figure 1:
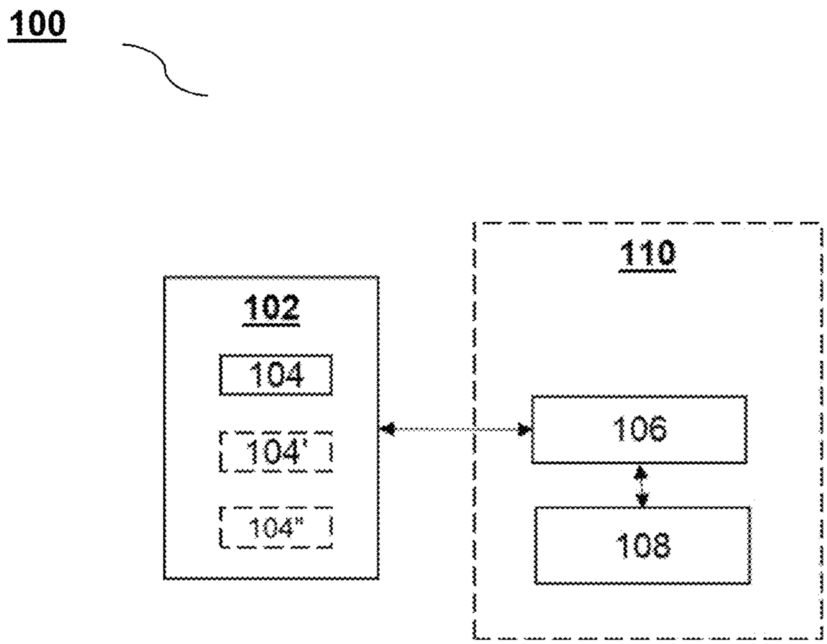
FIG. 1. shows a system block diagram of a 3D image processing system in accordance with an embodiment.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present a method and system for 3D image processing using multiple image beams captured in different frequencies.

Hereinafter, the term "continuous wave" refers to an electromagnetic wave, in particular a radio wave having a constant amplitude.

The term "image processing unit" used in the context herein should be interpreted broadly to encompass a general-purpose processor, a central processing unit (CPU), a microprocessor, a digital signal processor (DSP), a controller, a microcontroller, a state machine, and so forth. Under some circumstances, an "image processing unit" may refer to an application specific integrated circuit (ASIC), a programmable logic device (PLD), a field programmable gate array (FPGA), etc. The term "image processing unit" may also refer to a combination of processing devices, e.g., a combination of a DSP and a microprocessor, a plurality of microprocessors, one or more microprocessors in conjunction with a DSP core, or any other such configuration. Further, the "image processing unit" may be an embedded device, for example a system-on-chip (SoC) with multi-core processor architecture.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with an image processing unit if the image processing unit can read information from and/or write information to the memory. Memory that is integral to an image processing unit is in electronic communication with the image processing unit.

The term "critical" used in the context herein shall relate or denote a point of transition from one state to another. For example, a "critical point" identified on multiple 2D image beams may be a point of transition for creating 3D images from the 2D image beams. In the exemplary embodiments disclosed herein, the "critical points" may refer to location measurements which helps to identify facial features of a human captured in the 2D image beams.

The term "display device" used herein shall refer to electronic output device for presenting information in visual form. In the context of display devices of a motor vehicle, an example of a display device includes a full digital dashboard (also known as digital cluster), and a hybrid digital dashboard. Example of display elements may include liquid crystal displays (LCD) organic light emitting diode (OLED) displays and thin film transistors (TFT) displays.

FIG. 1 of the accompanying drawings which shows a system block diagram of a 3D image processing system in accordance with an exemplary embodiment. System 100 includes an image module 102 which includes at least one time of flight (TOF) image sensor 104. In another preferred embodiment, the image module 102 may include up to three TOF image sensors 104, 104' and 104". The image module 102 is in electronic communication with an image processing unit 106. In one embodiment, the image processing unit 106 may be embedded within the image module 102. In one embodiment, the image processing unit 106 may be in a vehicular system 110 connected to image module 102, as shown in FIG. 1, such that raw data captured by image module 102 is transmitted to the vehicular 110 and processed accordingly. The image processing unit 106 may include a memory 108, for storing data related to processed image beams. More in particular, critical points identified in the image beams captured may be stored in the memory 108 for future applications.

Figure 2:
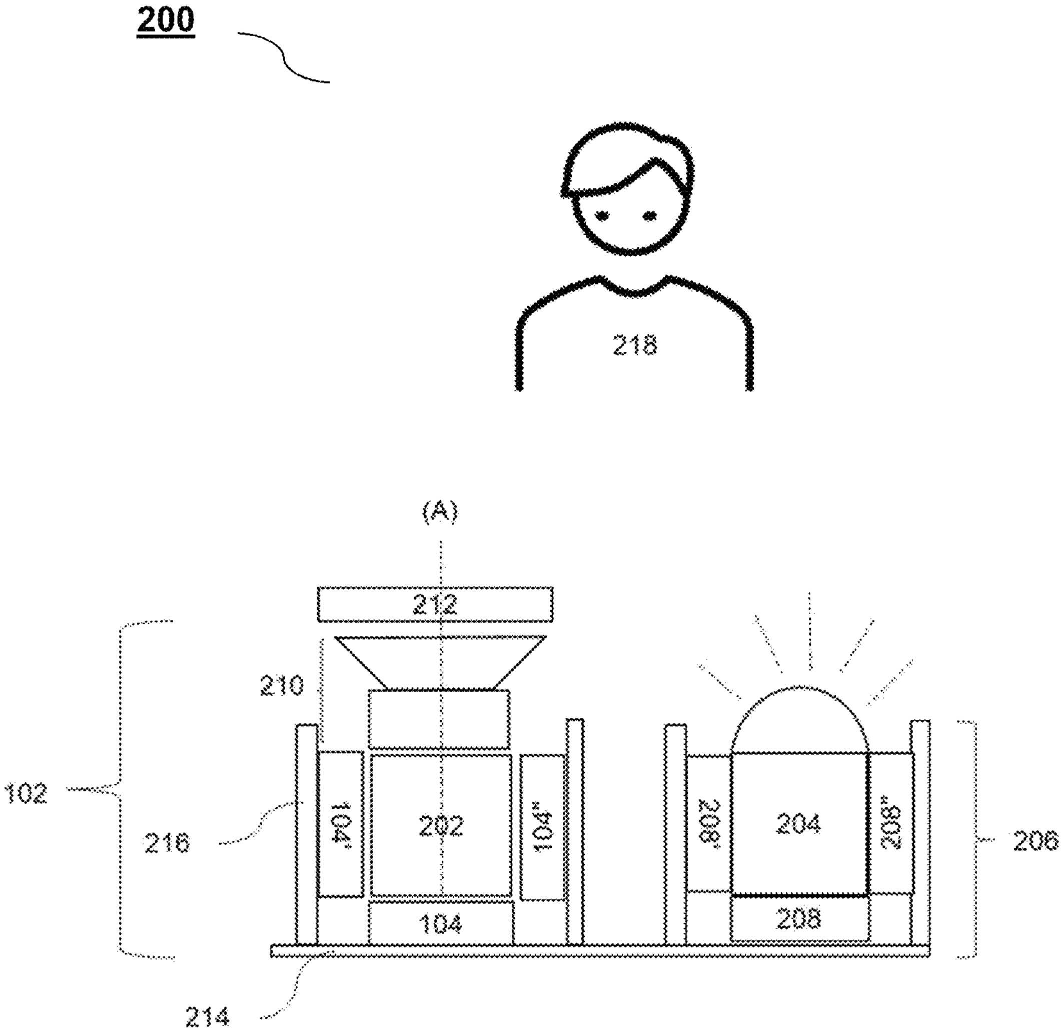
FIG. 2 shows a schematic diagram of a top view of 3D image processing system in accordance with an embodiment.

FIG. 2 shows a schematic diagram of a top view of 3D image processing system in accordance with an exemplary embodiment. The 3D image processing system 200 include an image module 102 and an illumination source 206. In this embodiment shown, the image module 106 comprises at least three TOF image sensors 104, 104' and 104" and an image beam splitter 202. In certain embodiments, the image beam splitter 202 is a near infrared (NIR) beam splitter, operable to split the image beams according to frequency ranges, to yield NIR image beams. An optical lens 210 is placed forward of the beam splitter, with a side of the optical lens 210 facing a view intended for monitoring. Depending on the needs of post-processing processes, the view may, by way of example, include a surrounding of a motor vehicle installed with a 3D image processing system as disclosed herein, or the view may be a view of a passenger cabin of a motor vehicle, but not limited thereto. The illumination source 206 shown in FIG. 2 comprises three light sensors 208, 208' and 208" operable to modulate light waves are three different frequencies. Notwithstanding the exemplary embodiment shown in FIG. 2, it shall be appreciated the inventive concept may be achieved using light waves in at least three frequencies to yield three image beams.

In an embodiment, the system 200 may be implemented in an interior of a motor vehicle, to process 3D images of a driver 218. Further post-processing of the 3D images may be required, to support functions of vehicular system 110 (FIG. 1 referred). An example of a vehicular system 110 may be a display device, for displaying a 3D image created by the image processing system 200 to act as a warning or alert to a driver. By way of an example, the images captured by an image module 102 may identify a pedestrian is dashing across the road from a far distance, thus the safety measurements can be carried out by the driver, or default automated vehicle safety functions may be executed by the motor vehicle.

In an embodiment, a marker cover may be placed forward of the optical lens 210. The marker cover may include an image pattern, for image beam calibration purposes. In the embodiment shown in FIG. 2, the system 200 includes an illumination source 206, which is separated from the image module 102 using partition 216. It shall be understood this arrangement is only an embodiment and other forms of arrangement may be application without departing from the scope and spirit of the inventive concept.

In an embodiment, the illumination source 206 may be modulating a single continuous wave (CW) light wave in at least three frequency, i.e. 100 MHZ, 20 MHz and 5 MHz or more preferably, 75 MHz, 13.64 MHz and 2.83 MHz. The selection of frequencies shall ideally, generate a working range in a primary number. A main advantage of selecting frequency in a primary number working range optimizes the performance of long-range an high accuracy processing. In another embodiment, the illumination source 206 may modulate three light waves 206, 206' and 206", each of the light waves modulating CW light wave in 100 MHz, 20 MHz and 5 MHz or more preferably, 75 MHz, 13.64 MHz and 2.83 MHz respectively. Additionally, a diffuser 204 may be included to transmit CW light rays through the illumination source 206. The system 200 will be in electronic communication with image processing unit 106 and memory 108, both of which are not shown in FIG. 2.

Optionally, the image module 102 may include other optical elements (not shown) such as filters to enhance filtering of wavelengths or type of frequencies received by the image module 102. The image module 102 is in electronic communication with a circuitry 214, to supply electrical power to the system 200. A suitable type of circuitry 214 may be a printed circuit board (PCB) or flexible PCB. It shall be understood by a skilled practitioner, the afore mentioned elements are optional features.

Figure 3:
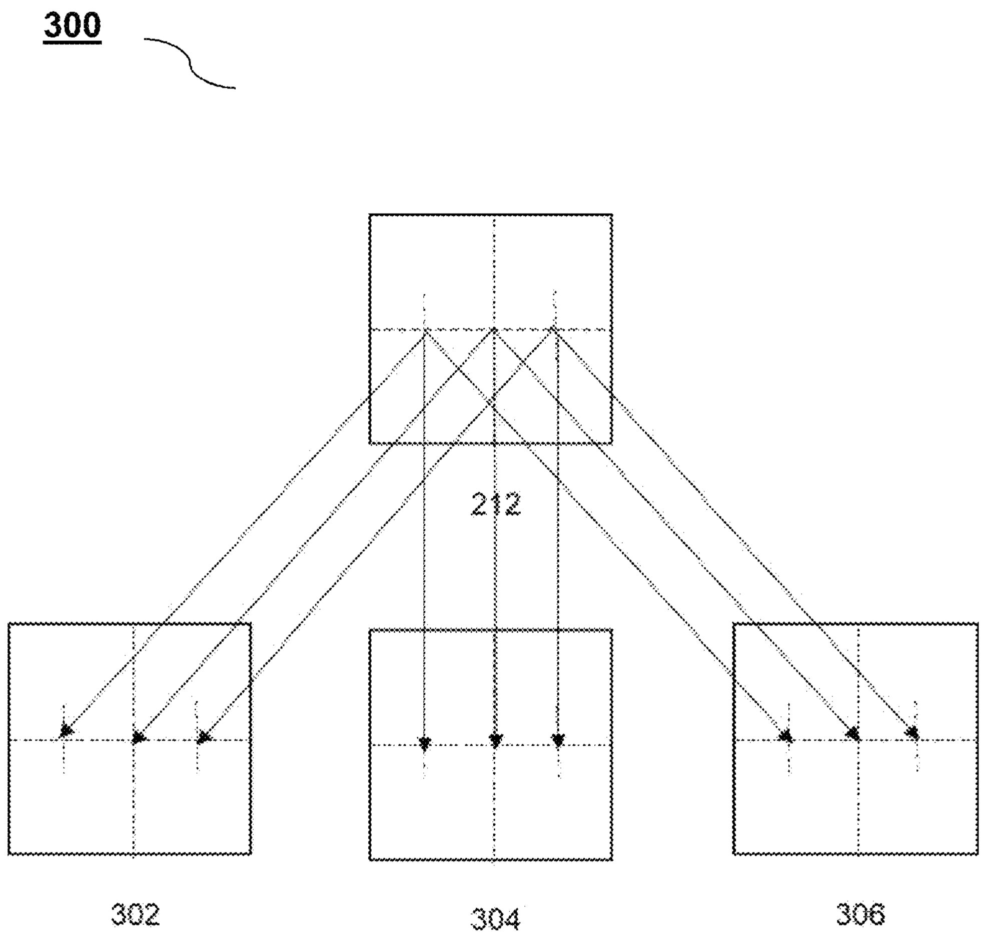
FIG. 3 shows an image pattern calibration process in accordance with an embodiment.

FIG. 3 shows an image pattern calibration process 300 in accordance with an exemplary embodiment. In this embodiment, an image pattern 212 is compared against three image beams 302, 304 and 306 captured by the image module 102. For clarity and brevity, each of the image beams contains a content captured in a different frequency, for example, image beam 302 captures a content in a 100 MHz frequency, image beam 304 captures a content in a 20 MHz frequency and image beam 306 captures a content in a 5 MHz frequency. In an embodiment, the content may include image beams of a driver 218 within an interior of a motor vehicle. Two or more points of pixel coordinates by be selected and calibrated against the image pattern 212. The calibration process may be executed by the image processing unit 106, to identify critical points on the image beams. The critical points identified may be stored in memory 108 and retrievable during image post-processing process. Example of critical points may be an eye position, a head position, at least one characteristics of a facial feature or combination thereof, of which further image post-processing process may be used for example, determining state of a driver.

Figure 4:
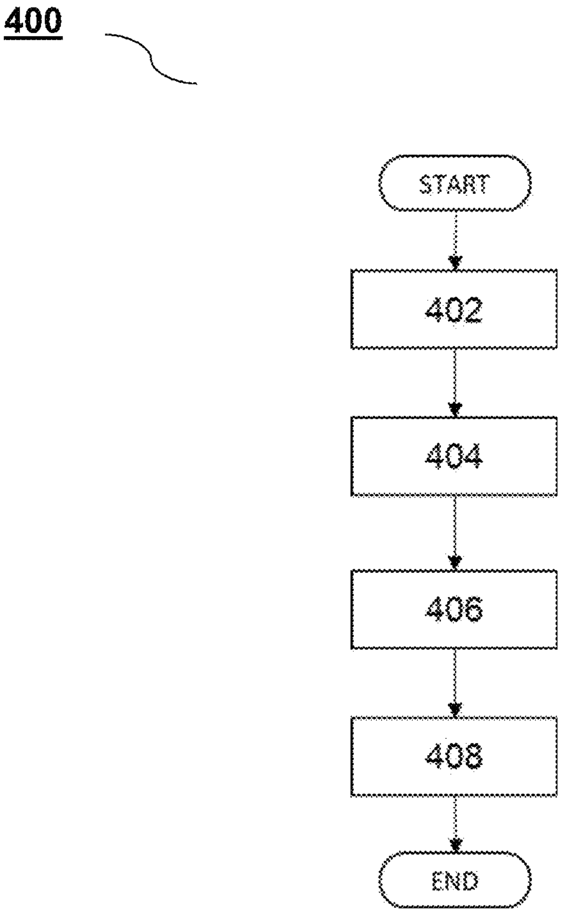
FIG. 4 shows a flowchart of 3D image process method in accordance with an embodiment.

FIG. 4 shows a flowchart 400 of 3D image process method in accordance with an embodiment, and in particular in accordance with a 3D image processing system as disclosed herein. In a step 402, an illumination source modulates a CW light wave to an image module in at least three frequencies. The three frequencies, namely 100 MHZ, 20 MHz and 5 MHz. In a next step 404, the image module receives at least three image beams. Each of the image beam contains a content of an interior of a motor vehicle captured in at least a different frequency. In a next step 406, an image processing unit correlate a location measurement of the at least three image beams captured by the image module. In a next step 408, in response to the location measurement correlated, a 3D image is created.

In an embodiment, the location measurement comprises identifying a distance alignment amongst the at least three image beams captured. The distance alignment may be a point of pixel coordinate coinciding on the at least three image beams captured. The main concept of correlating a location measurement is to locate a true location on the image beams capture in different frequencies, where all the differences agree, since each frequency modulation will contain a different ambiguous distance based upon raw data captured. This feature provides the advantage of achieving high accuracy and fast image processing, which is important to overcome aliasing effects which cannot be achieve by conventional implementation of TOF sensors per se. Advantageously, determining a true location avoids the danger of misinforming a driver with regard to an exact location of a pedestrian dashing across the road, thereby avoiding traffic accident when the system disclosed herein is used as a surround view system for motor vehicles. The same principles apply to driver monitoring systems or cabin monitoring systems.

The image processing unit may further include a step to align two or more points of pixel coordinates of the at least three image beams captured with reference to a single optical axis (A) as described above with reference to FIG. 2. In a next step, in response to the two or more pixel coordinates identified, the image processing unit may identify one or more critical point of coordinates on the at least three image beams correlated. The critical points identified may then be stored in a memory either stand alone or integrated in the image processing unit, for use as reference data. By way of an example, the critical points may be used to identify facial features of a user.

In an embodiment using only one CW light wave and one TOF image sensor, the location measurement includes adjusting a frequency modulation of the at least three image beams captured. A distance alignment may be identified subsequent to the frequency modulation, to locate a true distance, i.e. a point of pixel coordinate coinciding on the at least three image beams captured.

Thus, it may be seen that a method and system of 3D image processing that captures and process raw image data in multiple frequency has been provided. Other advantages of the method and system disclosed herein include producing 3D images with high accuracy and fast processing time. While exemplary embodiments have been presented in the foregoing detailed description of the disclosure, it should be appreciated that a vast number of variation exist.

It should further be appreciated that the embodiments are only examples, and are not intended to limit the scope, applicability, operation or configuration of the disclosure in any way. Rather, the foregoing detailed description will provide those skilled in the art with a convenient road map for implementing an embodiment of the disclosure, it being understood that various changes may be made in the function and arrangement of elements and method of operation described in the embodiment without departing from the scope of the disclosure as set forth in the appended claims.

The invention claimed is:

1. A method of processing images, the method comprising:

modulating, by way of an illumination source, a single continuous wave (CW) light wave to an image module, independently in at least three different frequencies in a primary number working range;

receiving, by way of the image module, at least three image beams, each of the at least three image beams containing a content of a moving object captured in one of the three different frequencies;

correlating, by way of an image processing unit, a location measurement of the at least three image beams captured by the image module, wherein each of the three image beams contains an image of the moving object captured in a different frequency;

calibrating, by way of the image processing unit, two or more points of pixel coordinates on the at last three image beams captured against an image pattern of a vehicle occupant to identify one or more features of the vehicle occupant and align the pixel coordinates of the at least three image beams; and creating a three-dimensional (3D) image, in response to the location measurement correlated.

2. The method of claim 1, wherein the location measurement comprises identifying, by way of the image processing unit, a distance alignment amongst the at least three image beams captured.

3. The method of claim 2, wherein the distance alignment comprises a point of pixel coordinate coinciding on the at least three image beams captured.

4. The method of claim 1, further comprising aligning, by way of the image processing unit, two or more points of pixel coordinates of the at least three image beams captured with reference to a single optical axis.

5. The method of claim 1, further comprising identifying, by way of the image processing unit, one or more critical point of pixel coordinates on the at least three image beams captured.

6. The method of claim 1, wherein correlating the location measurement of the at least three image beams captured by the image module comprises:

adjusting a frequency modulation of the at least three image beams captured; and identifying the distance alignment amongst the at least three beams captured.

7. The method according to claim 1, further comprising storing the one or more critical point of coordinates identified in a memory of the image processing unit for a post-processing process.

8. The method of claim 7, wherein the post-processing process comprises identifying an eye position of the vehicle occupant, a head position of a vehicle occupant, at least one characteristics of a facial feature of a vehicle occupant, a hand gesture of a vehicle occupant, a vehicle seat belt status of a vehicle occupant, a presence of a living object in an interior cabin of a motor vehicle in response to locking of at least one vehicle access of the motor vehicle, a living object moving towards a motor vehicle relative to a radius surrounding the motor vehicle, or combination thereof, in response to the 3D image created.

9. The method of claim 1, further comprising displaying the three-dimensional (3D) image created on a display device within an interior of a motor vehicle.

10. A three-dimensional (3D) image processing system, the 3D image processing system comprising:

an image module operable to receive at least three image beams, each of the at least three image beams containing a content of a moving object captured in a different frequency;

an illumination source operable to modulate a single continuous wave (CW) light wave to the image module in at least three different frequencies in a primary working number range; and an image processing unit operable to process the at least three image beams captured by the image module wherein the image processing unit is operable to correlate a location measurement of the at least three image beams captured by the image module, wherein each of the at least three image beams is captured in one of the three different frequencies, calibrate two or more points of pixel coordinates on the at last three image beams captured against an image pattern of a vehicle occupant to identify one or more features of the vehicle occupant and align the pixel coordinates of the at least three image beams and align the pixel coordinates of the at least three image beams, and create a three-dimensional (3D) image in response to the location measurement correlated.

11. The system of claim 10, wherein the image module is operable to capture at least three image beams of the moving object containing image content in at least three different frequencies.

12. The system of claim 10, further comprising an optical lens operable to cover the image module, wherein a side of the optical lens is facing the moving object and operable to receive ambient light rays surrounding the moving object.

13. The system of claim 10, wherein the image module comprises at least one time-of-flight (TOF) image sensor.

14. The system of claim 10, wherein the image module comprises three time-of-flight (TOF) image sensors.

15. The system of claim 14, further comprising:

an image beam splitter operable to provide a single optical axis (A) to capture the content of the moving object and transmit one or more image beams to each of the three TOF image sensors.

16. The system of claim 15, wherein the image beam splitter is a near infrared (NIR) beam splitter.

17. The system of claim 10, further comprising:

an image pattern placed forward of the side of the optical lens facing the moving object, wherein two or more points of pixel coordinates on the image beams captured is calibrated against the image pattern, to identify one or more critical point of pixel coordinates on the at least three image beams captured.

18. A computer program storage device comprising instructions to cause an image processing system to execute the steps of a method, the method comprising:

modulating, by way of an illumination source, a single continuous wave light wave to an image module independently in at least three different frequencies in a primary number working range;

receiving, by way of the image module, at least three image beams, each of the at least three image beam containing a content of a moving object captured in one of the three different frequencies;

correlating, by way of an image processing unit, a location measurement of the at least three image beams captured by the image module, wherein each of the three image beams contains an image of the moving object captured in a different frequency;

calibrating, by way of the image processing unit, two or more points of pixel coordinates on the at last three image beams captured against an image pattern of a vehicle occupant to identify one or more features of the vehicle occupant and align the pixel coordinates of the at least three image beams and align the pixel coordinates of the at least three image beams; and creating a three-dimensional (3D) image, in response to the location measurement correlated.

19. A non-transitory computer-readable medium storing instructions to cause an image processing system to execute the steps of a method, the method comprising:

modulating, by way of an illumination source, a single continuous wave light wave to an image module independently in at least three different frequencies in a primary number working range;

receiving, by way of the image module, at least three image beams, each of the at least three image beam containing a content of a moving object captured in one of the three different frequencies;

correlating, by way of an image processing unit, a location measurement of the at least three image beams captured by the image module, wherein each of the three image beams contains an image of the moving object captured in a different frequency;

calibrating, by way of the image processing unit, two or more points of pixel coordinates on the at last three image beams captured against an image pattern of a vehicle occupant to identify one or more features of the vehicle occupant and align the pixel coordinates of the at least three image beams to align the pixel coordinates of the at least three image beams; and creating a three-dimensional (3D) image, in response to the location measurement correlated.

* * * * *